United States Patent
Mu et al.

(10) Patent No.: US 11,425,742 B2
(45) Date of Patent: Aug. 23, 2022

(54) METHOD FOR DETERMINING AN UPLINK SCHEDULING MANNER, USER EQUIPMENT AND BASE STATION

(71) Applicant: NTT DOCOMO, INC., Tokyo (JP)

(72) Inventors: Qin Mu, Beijing (CN); Liu Liu, Beijing (CN); Xiaolin Hou, Beijing (CN); Wenjia Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 16/648,221

(22) PCT Filed: Sep. 13, 2018

(86) PCT No.: PCT/CN2018/105363
§ 371 (c)(1),
(2) Date: Mar. 17, 2020

(87) PCT Pub. No.: WO2019/056974
PCT Pub. Date: Mar. 28, 2019

(65) Prior Publication Data
US 2020/0267744 A1     Aug. 20, 2020

(30) Foreign Application Priority Data
Sep. 20, 2017   (CN) .......................... 201710855514

(51) Int. Cl.
*H04W 72/04*   (2009.01)
*H04W 72/12*   (2009.01)
(Continued)

(52) U.S. Cl.
CPC ... *H04W 72/1268* (2013.01); *H04W 72/1252* (2013.01); *H04W 72/14* (2013.01)

(58) Field of Classification Search
None
See application file for complete search history.

(56) References Cited

U.S. PATENT DOCUMENTS

2009/0103438 A1* 4/2009 Groh ................. H04W 72/1242
                                                                370/235
2019/0141731 A1* 5/2019 Yoshimoto ............ H04W 76/27
(Continued)

FOREIGN PATENT DOCUMENTS

CN              106793091 A        5/2017

OTHER PUBLICATIONS

3GPP TSG-RAN WG2 NR Ad Hoc #2; R2-1707269 "On the UE behaviour regarding grant-free transmissions" MediaTek Inc.; Qingdao, China; Jun. 27-29, 2017 (3 pages).
(Continued)

*Primary Examiner* — Sai Aung
(74) *Attorney, Agent, or Firm* — Osha Bergman Watanabe & Burton LLP

(57) ABSTRACT

A method for determining an uplink scheduling manner, a user equipment and a base station are disclosed. A method for determining an uplink scheduling manner performed by a user equipment includes: determining a communication parameter regarding the user equipment; determining, based on the communication parameter and a threshold regarding the communication parameter, to perform uplink data transmission based on an uplink grant based scheduling manner, or to perform the uplink data transmission based on an uplink grant free scheduling manner.

10 Claims, 7 Drawing Sheets

(51) Int. Cl.
*H04W 72/14* (2009.01)
*H04W 74/00* (2009.01)

(56) References Cited

U.S. PATENT DOCUMENTS

| | | | |
|---|---|---|---|
| 2019/0159139 A1* | 5/2019 | Yamada | H04W 52/365 |
| 2019/0215818 A1* | 7/2019 | Takeda | H04W 72/1289 |
| 2019/0223208 A1* | 7/2019 | Yoshimoto | H04L 5/0055 |
| 2020/0146029 A1* | 5/2020 | Takeda | H04W 72/0446 |

OTHER PUBLICATIONS

3GPP TSG RAN WG1 NR Ad-Hoc#2; R1-1710834 "On support of Grant-free and Grant-based transmission for UL URLLC" MediaTek Inc.; Qingdao, P.R. China; Jun. 27-30, 2017 (4 pages).
3GPP TSG RAN WG1 Meeting #86bis; R1-1608803 "Discussion on grant-free transmission for UL multiple access" Fujitsu; Lisbon, Portugal; Oct. 10-14, 2016 (3 pages).
International Search Report issued in International Application No. PCT/CN2018/105363, dated Nov. 29, 2018 (5 pages).
3GPP TSG RAN WG1 Meeting #89; R1-1707766 "Discussion of procedures for UL transmission with and without grant" Lenovo, Motorola Mobility; Hangzhou, China; May 15-19, 2017 (5 pages).
Office Action issued in Chinese Application No. 201880058916.9; dated Oct. 9, 2021 (12 pages).

* cited by examiner

METHOD FOR DETERMINING AN UPLINK SCHEDULING MANNER, USER EQUIPMENT AND BASE STATION

CROSS-REFERENCE TO RELATED APPLICATIONS

This application is a 371 U.S. National Phase of International Application No. PCT/CN2018/105363, filed on Sep. 13, 2018, which claims priority to Chinese Application No. 201710855514.9, filed on Sep. 20, 2017. The entire disclosures of the above applications are incorporated herein by reference.

TECHNICAL FIELD

The present invention relates to a field of communications, and in particular, to a method for determining an uplink scheduling manner, a user equipment, and a base station.

BACKGROUND

In the case of traditional LTE (long-term evolution), both uplink and downlink transmissions are based on base station scheduling. Before uplink transmission, a user equipment (UE) needs to transmit a Scheduling Request (SR) to a base station, and then the base station transmits Downlink Control Information (DCI) containing an uplink scheduling grant (UL grant) to indicate time-frequency resources, modulation and coding methods, Hybrid Automatic Repeat reQuest (HARQ) timing of the uplink transmission, and so on.

Advantages of UL Grant Based (UGB) scheduling manner are: 1) collision-free; 2) tight link adaptation and power control; 3) aperiodic CSI triggers may be carried in the UL grant. However, since the user equipment needs to transmit a Scheduling Request (SR) to the base station and wait for UL grant from the base station, it will inevitably lead to additional signaling overhead and scheduling delay.

With the development of new wireless technologies, due to high delay requirements or small data packets for ultra-reliable and low-latency services and massive machine type communications, it is desirable to introduce an uplink grant free (UL grant free, UGF) method. That is, before uplink transmission, it is neither necessary to transmit the SR to the base station, nor necessary to wait for the resource indication of UL grant from the base station, instead, the UE itself selects the resources for uplink transmitting.

Compared with the UGB scheduling manner, the advantages of the UGF scheduling manner are lower signaling overhead and scheduling delay. However, it also has the following disadvantages at the same time: 1) collision; 2) inaccurate link adaptation and power control; 3) no available channel to trigger aperiodic CSI feedback.

In other words, as two manners of uplink scheduling, both UGB and UGF have advantages and disadvantages.

SUMMARY OF THE INVENTION

In view of the above circumstances, it is desirable to provide a method, a user equipment, and a base station that may adaptively determine a better uplink scheduling manner for different communication scenarios.

According to one aspect of the present invention, a method for determining an uplink scheduling manner performed by a user equipment is provided, including: determining a communication parameter regarding the user equipment determining, based on the communication parameter and a threshold regarding the communication parameter, to perform uplink data transmission based on an uplink grant based scheduling manner, or to perform the uplink data transmission based on an uplink grant free scheduling manner.

According to another aspect of the present invention, a method for determining an uplink scheduling manner performed by a base station is provided, including: determining a communication parameter of the base station; generating, based on current communication parameter, a first instruction that indicates to perform uplink data transmission based on an uplink grant based scheduling manner, or a second instruction that indicates to perform the uplink data transmission based on an uplink grant free scheduling manner; and transmitting the generated first instruction or second instruction to the user equipment According to still another aspect of the present invention, a user equipment is provided for performing determination of an uplink scheduling manner, including: a communication parameter determining unit, configured to determine a communication parameter regarding the user equipment; and a scheduling manner determining unit, configured to determine, based on the communication parameter and a threshold regarding the communication parameter, to perform uplink data transmission based on an uplink grant based scheduling manner, or to perform the uplink data transmission based on an uplink grant free scheduling manner.

According to yet another aspect of the present invention, a base station is provided for performing determination of an uplink scheduling manner, including: a determining unit, configured to determine a communication parameter of the base station; an instruction generating unit, configured to generate, based on the communication parameter, a first instruction that indicates to perform uplink data transmission based on an uplink grant based scheduling manner, or a second instruction that indicates to perform the uplink data transmission based on an uplink grant free scheduling manner; and a transmitting unit, configured to transmit the generated first instruction or second instruction to the user equipment.

The method for determining the uplink scheduling manner, the user equipment, and the base station according to the embodiments of the present invention may adapt to different communication conditions and save more signaling overhead.

DESCRIPTION OF THE EMBODIMENTS

Hereinafter, various preferred implementations of the present invention will be described with reference to the accompanying drawings. The following description with reference to the accompanying drawings is provided to assist in understanding exemplary implementations of the invention as defined by the claims and their equivalents. It includes a variety of specific details to help understand, but they may only be considered as exemplary. Accordingly, those skilled in the art will recognize that various changes and modifications may be made to the implementations described herein without departing from the scope and spirit of the invention. Also, in order to make the specification clearer and more concise, detailed descriptions of functions and configurations well known in the art will be omitted.

Figure 1:
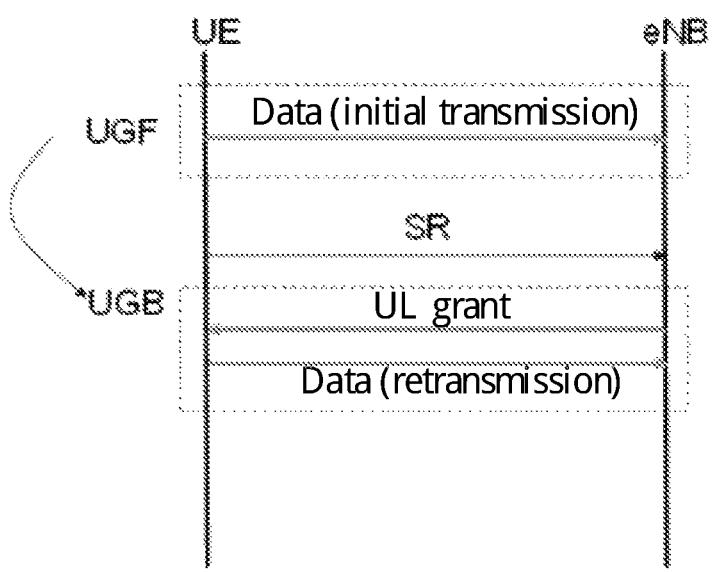
FIG. 1 is a schematic diagram illustrating a method for determining UGF and UGB according to a prior art.

In the prior art, a method for switching between UGB and UGF is proposed. Specifically, as shown in FIG. 1, on a user equipment side, UGF is used for the initial transmission, and the user equipment directly transmits uplink data to a base station. For retransmission, UGB is used, and the user equipment first transmits a scheduling request SR to the base station, and then waits for a UL grant from the base station to transmit the uplink data.

However, this fixed UGB and UGF switching method is still difficult to adapt to different communication scenarios.

Figure 2:
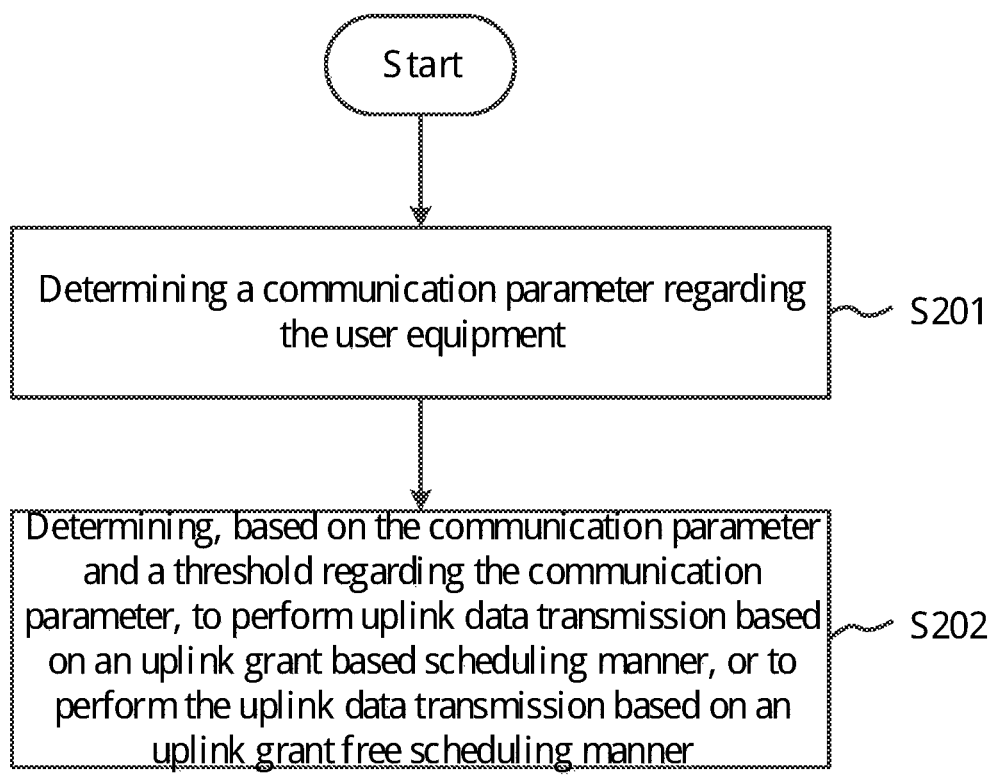
FIG. 2 is a flowchart illustrating a procedure of an uplink scheduling manner determination method performed by a user equipment according to a first embodiment of the present invention.

Specifically, in UGF, there are extra overhead and delay resulting from retransmissions caused by collisions and inappropriate link adaptation. As shown in FIG. 2, for example, when a collision occurs in transmitting the uplink data between different user equipments, it results in the retransmission. In addition, the user equipment may transmit the uplink data to the base station in a manner of four repetitions, but this cannot meet a requirement of 6 repetitions of the base station to correctly parse the data, which will cause retransmission.

In addition, in some cases, the extra overhead in UGF will be greater than signaling overhead in UGB. For example, in the case of relatively large data packets, the extra overhead of U G F will be greater than the signaling overhead in UGB. For another example, in a relatively poor channel environment, the extra overhead of UGF will be greater than the signaling overhead in UGB. As another example, in the case that the communication load is heavy, the extra overhead of U G F will be greater than the signaling overhead in UGB.

In UGF scheduling, there are no available channels that carry aperiodic CSI trigger indications.

Next, a first embodiment of a method for determining the uplink scheduling manner performed by the user equipment according to embodiments of the present invention will be described with reference to FIG. 2. As shown in FIG. 2, first, in step S201, a communication parameter regarding the user equipment is determined. Then, in step S202, based on the communication parameter and the threshold regarding the communication parameter, it is determined to perform the uplink data transmission based on an uplink grant based scheduling manner, or to perform the uplink data transmission based on an uplink grant free scheduling manner.

Here, it should be noted that the threshold regarding the communication parameter of the user equipment involved in step S202 may be determined by the user equipment itself. In this case, the step of determining the threshold for the communication parameter of the user equipment may include: determining the threshold based on a historical communication data of the user equipment.

Of course, the present invention is not limited to this. Alternatively, the threshold regarding the communication parameter of the user equipment involved in step S202 may also be received from outside. In this case, the method further includes: receiving information for the threshold regarding the communication parameter of the user equipment from the base station. That is, the threshold may also be determined by the base station.

Details regarding how the user equipment and the base station determine the threshold will be described respectively in detail in the description of specific implementations below.

In the method for determining the uplink scheduling manner performed by the user equipment according to the present invention, it is flexibly determined that different scheduling manners are used for the uplink data transmission based on the communication parameter of the user equipment side. Therefore, compared with the manner of fixedly using UGF for initial transmission and UGB for retransmission, it may better adapt to different communication conditions and reduce the signaling overhead to the full extent.

Next, several specific implementations of the method for determining the uplink scheduling manner on the user equipment side will be described.

A method for determining the uplink scheduling manner performed by the user equipment according to a first example of the present invention includes the following steps.

First, in step S201, the communication parameter regarding the user equipment is determined. In the first example, the communication parameter may be an amount of data to be transmitted by the user equipment.

Then, in step S202, based on the communication parameter and the threshold regarding the communication parameter, it is determined to perform the uplink data transmission based on the uplink grant based scheduling manner, or to perform the uplink data transmission based on the uplink grant free scheduling manner.

Specifically, in step S202, it may be judged whether the amount of data to be transmitted by the user equipment satisfies a predetermined condition. When the predetermined condition is satisfied, it is determined that the uplink data transmission is performed based on the uplink grant based scheduling manner, otherwise the uplink data transmission is performed based on the uplink grant free scheduling manner. For example, the predetermined condition may be that the amount of data to be transmitted is greater than the threshold. When the amount of data to be transmitted is greater than the threshold, it is determined that the uplink data transmission is performed based on the uplink grant based scheduling manner, otherwise the uplink data transmission is performed based on the uplink grant free scheduling manner.

For example, the amount of data to be transmitted by the user equipment may be characterized by a Buffer Status Report (BSR), which will be explained with reference to Table 1 below.

TABLE 1

| Scheduling Manner | UGF | UGB |
|---|---|---|
| Condition | BSR < X1 | BSR > X1 |

For example, a threshold here set for BSR is X1. If BSR>X1, the UGB scheduling manner is selected. The user equipment first transmits a scheduling request SR to the base station, and transmits the uplink data to the base station after receiving a UL grant from the base station. On the other hand, if BSR<X1, the UGF scheduling manner is selected. The user equipment directly transmits the uplink data to the base station.

In the case of the same collision probability, if the amount of data to be transmitted is large, the extra signaling overhead caused by retransmission is also large, and conversely, if the amount of data to be transmitted is small, the extra signaling overhead caused by retransmission is also small. Therefore, in the case that the amount of data to be transmitted is large (that is, a large data packet), the UGB manner is selected to avoid the large signaling overhead caused by retransmission in the UGF manner, while in the case that the amount of data to be transmitted is small (that is, a small packet), the UGF manner is selected to avoid the signaling overhead inherent in the UGB manner.

In addition, the threshold regarding the BSR may be determined by the user equipment itself. For example, the user equipment may determine the threshold based on the overall probability of retransmission in a previous transmission and a size of the UL grant. The specific formula is: X1=size of UL grant/probability of retransmission in the previous transmission in the user equipment.

Alternatively, the threshold regarding the BS R may also be determined by the base station and broadcasted to the user equipment. For example, the base station may determine the threshold based on the probability of retransmission in a current network and the size of the UL grant. The specific formula is: X1=size of UL grant/probability of retransmission in the current network.

A method for determining the uplink scheduling manner performed by the user equipment according to a second example of the present invention includes the following steps.

First, in step S201, the communication parameter regarding the user equipment is determined. In the second example, the communication parameter may be a channel condition parameter of the user equipment.

Then, in step S202, based on the communication parameter and the threshold regarding the communication parameter, it is determined to perform the uplink data transmission based on the uplink grant based scheduling manner, or to perform the uplink data transmission based on the uplink grant free scheduling manner.

Specifically, in step S202, it may be judged whether the channel condition parameter of the user equipment satisfies the predetermined condition. When the predetermined condition is satisfied, it is determined that the uplink data transmission is performed based on the uplink grant based scheduling manner, otherwise the uplink data transmission is performed based on the uplink grant free scheduling manner. For example, the predetermined condition may be that the channel condition parameter of the user equipment is greater than the threshold. When the channel condition parameter of the user equipment is greater than the threshold, it is determined that the uplink data transmission is performed based on the uplink grant based scheduling manner, otherwise the uplink data transmission is performed based on the uplink grant free scheduling manner.

For example, the channel condition parameter of the user equipment may be characterized by a Reference Signal Received Power (RSRP), which will be explained with reference to Table 2 below.

TABLE 2

| Scheduling Manner | UGF | UGB |
|---|---|---|
| Condition | RSRP > Y1 | RSRP < Y1 |

For example, a threshold here set for RSR P is Y1. If RSR P<Y1, the UGB scheduling manner is selected. The user equipment first transmits a scheduling request SR to the base station, and transmits uplink data to the base station after receiving a UL grant from the base station. On the other hand, if RSRP>Y1, the UGF scheduling manner is selected. The user equipment directly transmits uplink data to the base station.

Under good channel conditions, the probability of retransmission caused by incorrect link adaptation is small, so the extra overhead brought by retransmission is small. In contrast, under poor channel conditions, the probability of retransmission caused by incorrect link adaptation is large, so the extra overhead brought by retransmission is large. Therefore, in the case of poor channel conditions, the UGB manner is selected to avoid the large signaling overhead caused by retransmission in the UGF manner, and in the case of good channel conditions, the UGF manner is selected to avoid the signaling overhead inherent in the UGB manner.

In addition, the threshold regarding the channel condition parameter may be determined by the user equipment itself. For example, the user equipment may determine the threshold based on a probability of previous retransmission and an average data size of a previous transmission under different RSRP ranges. Specifically, the probability of retransmission $P\_rx\_RSRP$ under RSRP may be calculated by the following formula: $P\_rx\_RSR P$=size of UL grant/average data size. The RSRP threshold is then determined according to a mapping between the probability of retransmission and a RSRP state.

Alternatively, the threshold regarding the channel condition parameter may also be determined by the base station and broadcasted to the user equipment. For example, the base station may determine the threshold based on the overall probability of retransmission and the average data size under different RSRP ranges. Specifically, the probability of retransmission under RSRP may be calculated by the following formula: $P\_rx\_RSR P$=size of UL grant/average data size. The RSRP threshold is then determined according to the mapping between the probability of retransmission and a RSRP state.

A method for determining the uplink scheduling manner performed by the user equipment according to a third example of the present invention includes the following steps.

First, in step S201, the communication parameter regarding the user equipment is determined. In the third example, the communication parameter may be the amount of data to be transmitted by the user equipment and the channel condition parameter of the user equipment.

Then, in step S202, based on the communication parameter and the threshold regarding the communication parameter, it is determined to perform the uplink data transmission based on the uplink grant based scheduling manner, or to perform the uplink data transmission based on the uplink grant free scheduling manner.

Specifically, in step S202, it may be judged whether the amount of data to be transmitted by the user equipment and the channel condition parameter of the user equipment satisfy the predetermined condition. When the predetermined condition is satisfied, it is determined that the uplink data transmission is performed based on the uplink grant based scheduling manner, otherwise the uplink data transmission is performed based on the uplink grant free scheduling manner. For example, the predetermined condition may include: when the amount of data to be transmitted by the user equipment is greater than a first threshold, the channel condition parameter of the user equipment is smaller than a second threshold; and when the amount of data to be transmitted by the user equipment is smaller than the first threshold, the channel condition parameter of the user equipment is smaller than a third threshold. When the amount of data to be transmitted by the user equipment is greater than the first threshold, if the channel condition parameter of the user equipment is smaller than the second threshold, it is determined that the uplink data transmission is performed based on the uplink grant based scheduling manner, otherwise the uplink data transmission is performed based on the uplink grant free scheduling manner. When the amount of data to be transmitted by the user equipment is smaller than the first threshold, if the channel condition parameter of the user equipment is smaller than the third threshold, it is determined that the uplink data transmission is performed based on the uplink grant based scheduling manner, otherwise the uplink data transmission is performed based on the uplink grant free scheduling manner.

For example, the amount of data to be transmitted by the user equipment may be characterized by a Buffer Status Report (BSR). The channel condition parameter of the user equipment may be characterized by a Reference Signal Received Power (RSRP), which will be explained with reference to Table 3 below.

TABLE 3

| Condition 1 | Condition 2 | Scheduling Manner |
| --- | --- | --- |
| BSR > X1 | RSRP > Y1 | UGF |
| | RSRP < Y1 | UGB |
| BSR < X1 | RSRP > Z1 | UGF |
| | RSRP < Z1 | UGB |

In the case that the amount of data to be transmitted is large, the threshold regarding RSRP is Y1, and in the case that the amount of data to be transmitted is small, the threshold for RSRP is Z1. Here, Z1 is smaller than Y1. That is, in the case that the amount of transmitted data is small, the requirement for channel condition may be appropriately reduced, that is, the threshold regarding the channel condition parameter is reduced.

In addition, the threshold regarding the channel condition parameter may be determined by the base station and broadcasted to the user equipment. For example, the threshold regarding BS R may be set freely. User equipment may calculate the average data size for different BSR ranges (BSR>X1 and BSR<X1), and then calculate the probability of retransmission for BSR>X1 and BSR<X1, respectively, based on the following formula: P_rx_RSRP=size of UL grant/average data size. Finally, respective thresholds are determined according to the mapping between the probability of retransmission and the RSRP state.

A method for determining the uplink scheduling manner performed by the user equipment according to a fourth example of the present invention includes the following steps.

First, in step S201, the communication parameter regarding the user equipment is determined.

Then, in step S202, based on the communication parameter and the threshold regarding the communication parameter, it is determined to perform the uplink data transmission based on the uplink grant based scheduling manner, or to perform the uplink data transmission based on the uplink grant free scheduling manner.

In the fourth example, the communication parameter may be a delay requirement associated with a type of transmitted data. The method further includes: receiving information indicating a communication load of a cell from the base station; and determining, based on the information indicating the communication load of the cell, the delay requirement, and a threshold regarding the delay requirement, to perform the uplink data transmission based on the uplink grant based scheduling manner, or to perform the uplink data transmission based on the uplink grant free scheduling manner.

For example, in the fourth example, the user equipment may select the scheduling manner based on different principles according to the communication load of the cell, which will be explained with reference to Table 4 below.

TABLE 4

| Condition 1 | Condition 2 | Scheduling Manner |
| --- | --- | --- |
| Communication Load > X1 | Delay Requirement > Y1 | UGF |
| | Delay Requirement < Y1 | UGB |
| Communication Load < X1 | Delay Requirement > Z1 | UGB |
| | Delay Requirement < Z1 | UGF |

In the case that the communication load is heavy, since the probability of retransmission is large, the delay in the UGF manner will be greater than the delay in the UGB manner. Conversely, in the case that the communication load is light, since the probability of retransmission is small, the delay in the UGF manner will be smaller than the delay in the UGB manner.

For example, a threshold here set for the communication load is X1. If the communication load is greater than X1, that is, in the case that the communication load is heavy, if the delay requirement is low (that is, the delay is long), the UGF scheduling manner is selected; if the delay requirement is high (that is, the delay is short), the UGB scheduling manner is selected. On the other hand, if the communication load is smaller than X1, that is, in the case that the communication load is light, if the delay requirement is low (that is, the delay is long), the UGB scheduling manner is selected; if the delay requirement is high (that is, the delay is short), the UGF scheduling manner is selected. It can be seen that, in the case of different communication loads, the scheduling manner selection criteria are reversed.

In addition, the thresholds Y1 and Z1 are not particularly limited here. They may be the same or different.

Figure 3:
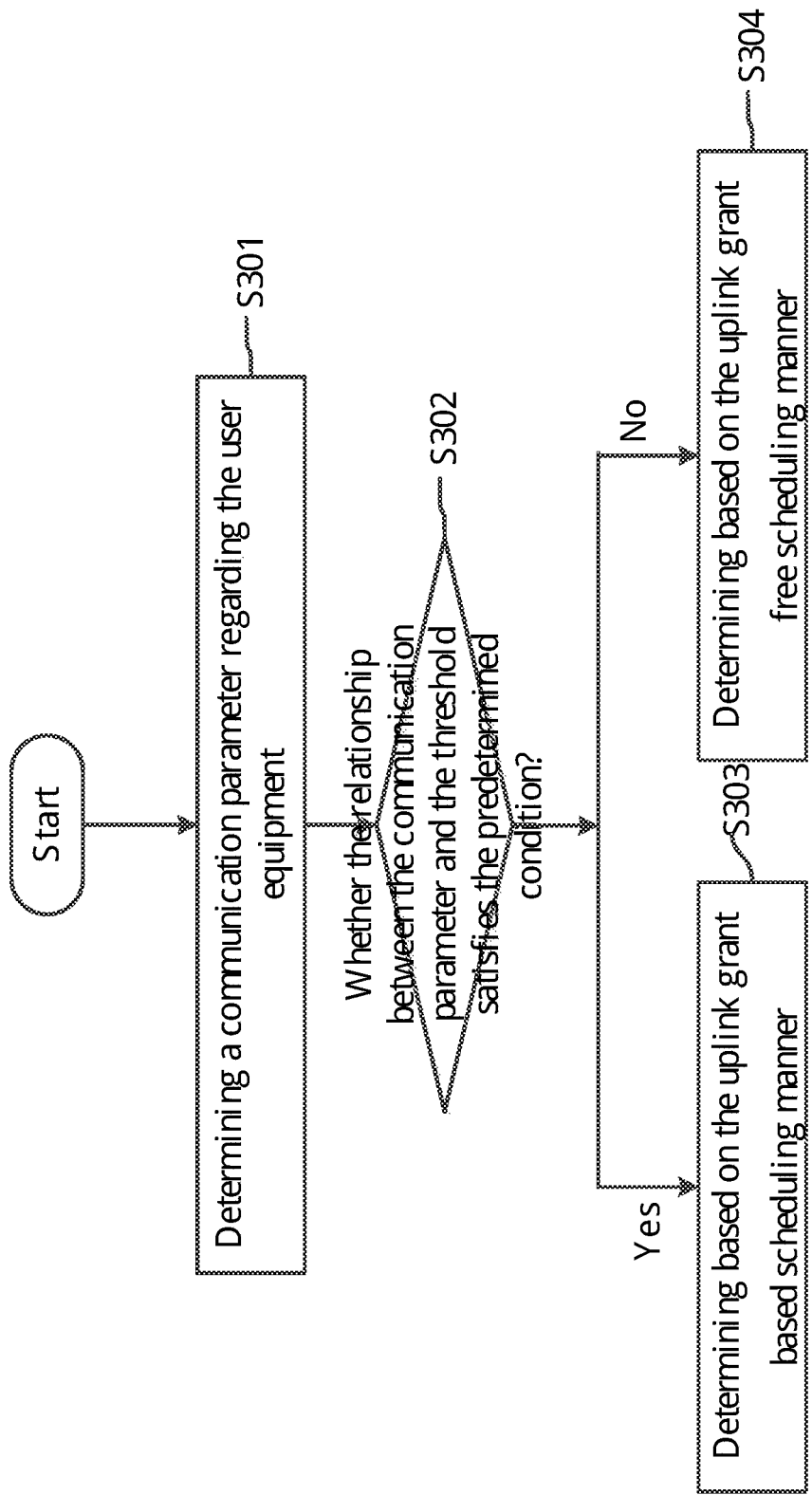
FIG. 3 is a flowchart illustrating a procedure of an uplink scheduling manner determination method performed by a user equipment according to a second embodiment of the present invention.

Step S202 as described in the first to fourth examples above may judge whether a relationship between the communication parameter and the threshold regarding the communication parameter satisfies the predetermined condition. Specifically, FIG. 3 illustrates a method for determining the uplink scheduling manner performed by the user equipment according to a second embodiment of the present invention. As shown in FIG. 3, first, in step S301, communication parameter regarding the user equipment is determined. Next, in step S302, it is determined whether the relationship between the communication parameter and the threshold regarding the communication parameter satisfies the predetermined condition.

If it is determined in step S302 that the relationship between the communication parameter and the threshold satisfies the predetermined condition, the process proceeds to step S303. In step S303, it is determined that the uplink data transmission is performed based on the uplink grant based scheduling manner.

On the other hand, if it is determined in step S302 that the relationship between the communication parameter and the threshold does not satisfy the predetermined condition, the process proceeds to step S304. In step S304, it is determined that uplink data transmission is performed based on the uplink grant free scheduling manner.

Figure 4:
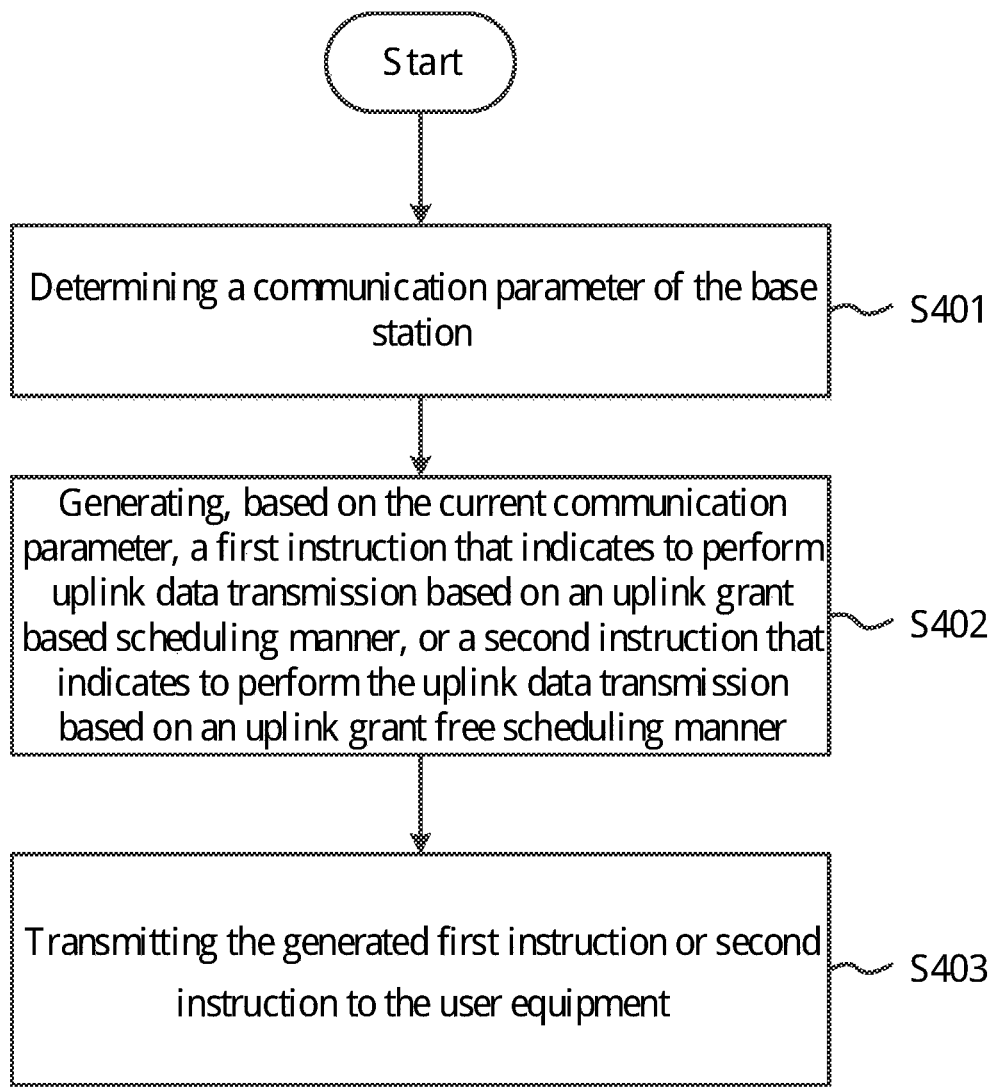
FIG. 4 is a flowchart illustrating a procedure of an uplink scheduling manner determination method performed by a base station according to the first embodiment of the present invention.

Next, a method for determining an uplink scheduling manner performed by a base station according to a first embodiment of the present invention will be described with reference to FIG. 4. As shown in FIG. 4, first, in step S401, communication parameter of the base station is determined. Next, in step S402, based on the current communication parameter, a first instruction that indicates to perform uplink data transmission based on an uplink grant based scheduling manner is generated, or a second instruction that indicates to perform the uplink data transmission based on an uplink grant free scheduling manner is generated. Finally, in step S403, the generated first instruction or second instruction is transmitted to the user equipment.

In the method for determining the uplink scheduling manner performed by the base station according to the present invention, it is flexibly selected to adopt different scheduling manners for uplink data transmission based on communication parameter in a cell. Therefore, compared with the manner of fixedly using UGF for initial transmission and UGB for retransmission, it may better adapt to different communication conditions and reduce the signaling overhead to the full extent.

After receiving the first instruction or second instruction from the base station, the user equipment determines to perform the uplink data transmission based on the uplink grant based scheduling manner, or to perform the uplink data transmission based on the uplink grant free scheduling manner.

Next, several specific implementations of the method for determining the uplink scheduling manner on the base station side will be described.

A method for determining the uplink scheduling manner performed by the base station according to a fifth example of the present invention includes the following steps.

First, in step S401, communication parameter of the base station is determined. In the fifth example, the communication parameter is a communication load in a cell.

Next, in step S402, based on the current communication parameter, a first instruction that indicates to perform uplink data transmission based on an uplink grant based scheduling manner is generated, or a second instruction that indicates to perform the uplink data transmission based on an uplink grant free scheduling manner is generated.

Specifically, in step S402, it can be judged whether the communication load in the cell satisfies a predetermined condition. When the predetermined condition is satisfied, the first instruction that indicates to perform uplink data transmission based on an uplink grant based scheduling manner is generated, otherwise the second instruction that indicates to perform the uplink data transmission based on an uplink grant free scheduling manner is generated. The predetermined condition may be that the communication load is greater than a threshold regarding the communication load, which will be explained with reference to Table 5 below.

TABLE 5

| Scheduling Manner | UGB | UGF |
|---|---|---|
| Condition | Communication Load > X1 | Communication Load < X1 |

For example, a threshold here set for the communication load is X1. If the communication load is larger than X1, the first instruction that indicates to perform uplink data transmission based on an uplink grant based scheduling manner is generated. On the other hand, if the communication load is smaller than X1, the second instruction that indicates to perform the uplink data transmission based on an uplink grant free scheduling manner is generated.

Finally, in step S403, the generated first instruction or second instruction is transmitted to the user equipment.

After receiving the first instruction or second instruction from the base station, the user equipment determines to perform the uplink data transmission based on the uplink grant based scheduling manner, or to perform the uplink data transmission based on the uplink grant free scheduling manner.

A method for determining an uplink scheduling manner performed by the base station according to a sixth example of the present invention includes the following steps.

First, in step S401, communication parameter of the base station is determined. In the sixth example, the communication parameter is an aperiodic CSI feedback trigger indication.

Next, in step S402, based on the current communication parameter, a first instruction that indicates to perform uplink data transmission based on an uplink grant based scheduling manner is generated, or a second instruction that indicates to perform the uplink data transmission based on an uplink grant free scheduling manner is generated.

Specifically, in step S402, it may be judged whether the aperiodic CSI feedback trigger indication satisfies the predetermined condition. When the predetermined condition is satisfied, the first instruction that indicates to perform uplink data transmission based on an uplink grant based scheduling manner is generated, otherwise the second instruction that indicates to perform the uplink data transmission based on an uplink grant free scheduling manner is generated. The predetermined condition may be that the aperiodic CSI feedback trigger indication indicates that a user equipment is required to report aperiodic CSI feedback. That is, if there is a need to trigger the aperiodic CSI feedback from the user equipment to the base station, a UGB scheduling manner is selected, so that the aperiodic CSI triggering indication may be carried in the U L grant. If there is no need to trigger the aperiodic CSI feedback from the user equipment to the base station, a UGF scheduling manner is selected to reduce signaling overhead.

Figure 5:
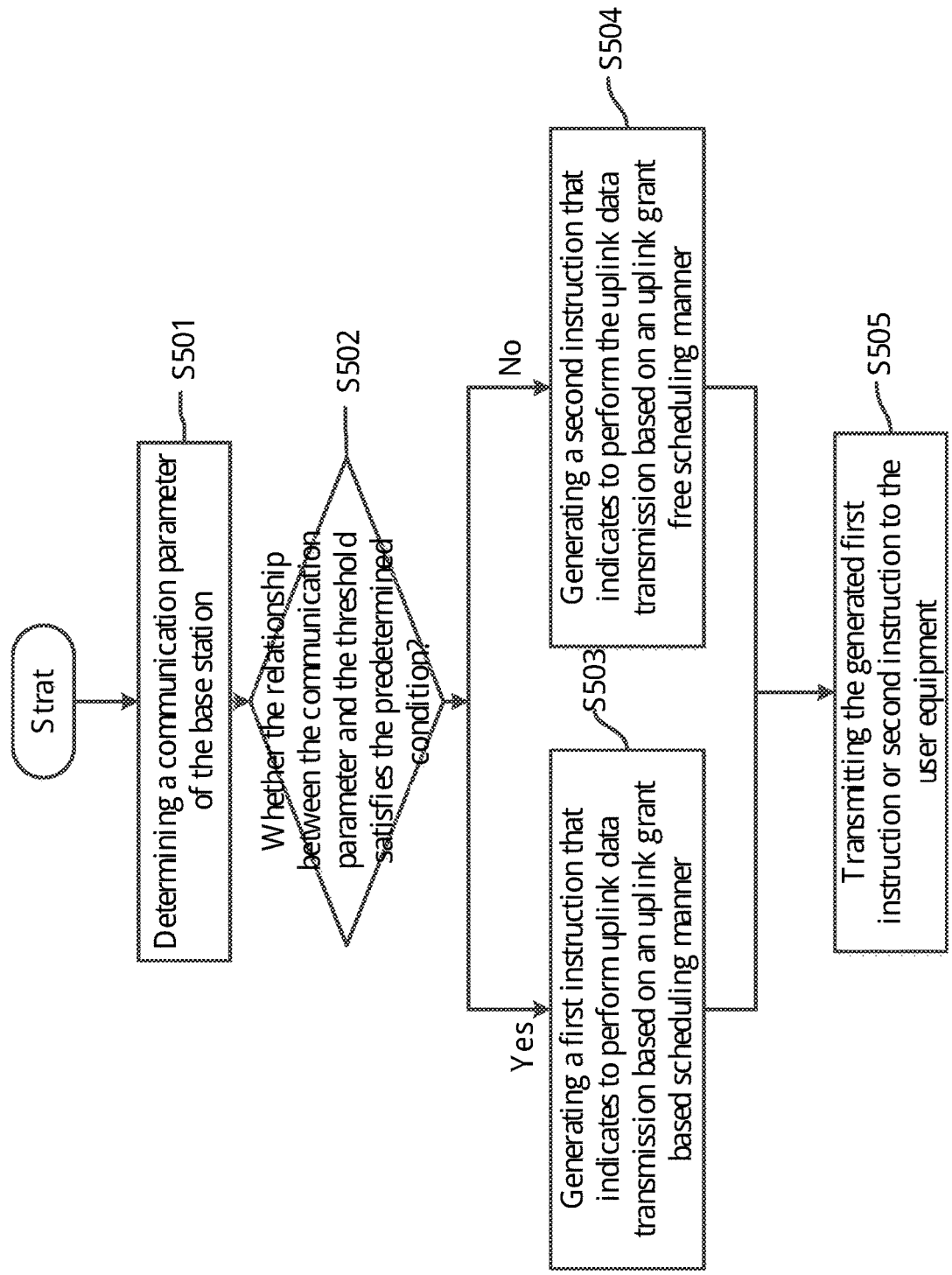
FIG. 5 is a flowchart illustrating a procedure of an uplink scheduling manner determination method performed by a base station according to a second embodiment of the present invention.

Step S402 as described in the fifth to sixth examples above may judge whether the communication parameter satisfies the predetermined condition. Specifically, FIG. 5 illustrates a method for determining the uplink scheduling manner performed by the base station according to a second embodiment of the present invention. As shown in FIG. 5, first, in step S501, communication parameter of the base station is determined. Then, in step S502, it is judged whether the communication parameter satisfies the predetermined condition.

If it is determined in step S502 that the current communication parameter satisfies the predetermined condition, the process proceeds to step S503. In step S503, the first instruction that indicates to perform uplink data transmission based on an uplink grant based scheduling manner is generated.

On the other hand, if it is determined in step S502 that the current communication parameter does not satisfy the predetermined condition, the process proceeds to step S504. In step S504, the second instruction that indicates to perform the uplink data transmission based on an uplink grant free scheduling manner is generated.

Then, in step S505, the generated first instruction or second instruction is transmitted to the user equipment.

In the foregoing, the methods for determining the uplink scheduling manner performed by the user equipment side and the base station side according to the embodiments of the present invention have been described in detail with reference to FIGS. 2 to 5. Next, the configurations of the user equipment and the base station will be described correspondingly to this.

Figure 6:
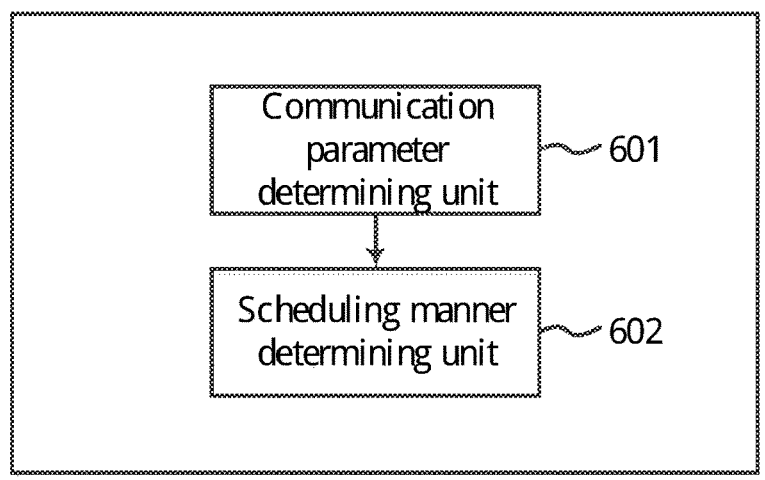
FIG. 6 is a functional block diagram illustrating a configuration of a user equipment for performing uplink scheduling manner determination according to the present invention.

A user equipment according to the embodiments of the present invention is described with reference to FIG. 6 for performing determination of an uplink scheduling manner. As shown in FIG. 6, the user equipment 600 includes a communication parameter determining unit 601 and a scheduling manner determining unit 602.

The communication parameter determining unit 601 is configured to determine a communication parameter regarding the user equipment.

The scheduling manner determining unit 602 is configured to determine, based on the communication parameter and a threshold regarding the communication parameter, to perform uplink data transmission based on an uplink grant based scheduling manner, or to perform the uplink data transmission based on an uplink grant free scheduling manner.

Here, it should be noted that the threshold regarding the communication parameter involved in the scheduling manner determining unit 602 may be determined by the user equipment itself. In this case, the user equipment 600 may further include: a threshold determining unit (not shown in the figure), configured to determine the threshold based on a historical communication data of the user equipment.

Of course, the present invention is not limited to this. Alternatively, the threshold regarding the communication parameter of the user equipment may also be received from the outside. In this case, the user equipment 600 may further include: a receiving unit (not shown in the figure), configured to receive information for the threshold regarding the communication parameter from a base station. That is, the threshold may also be determined by the base station and broadcasted to the user equipment.

In the user equipment according to the present invention, it is flexibly selected to use different scheduling manners for the uplink data transmission based on the communication parameter of the user equipment side. Therefore, compared with the manner of fixedly using UGF for a first transmission and UGB for retransmission, it may better adapt to different communication conditions and reduce the signaling overhead to the full extent.

Next, several specific implementations of the user equipment for performing determination of the uplink scheduling manner according to the present invention will be described.

The user equipment according to the seventh example of the present invention includes the communication parameter determining unit 601 and the scheduling manner determining unit 602.

The communication parameter determining unit 601 is configured to determine the communication parameter regarding the user equipment. In the seventh example, the communication parameter may be an amount of data to be transmitted by the user equipment, The scheduling manner determining unit 602 is configured to determine, based on the communication parameter and the threshold regarding the communication parameter, to perform uplink data transmission based on the uplink grant based scheduling manner, or to perform the uplink data transmission based on the uplink grant free scheduling manner.

Specifically, the scheduling manner determining unit 602 may judge whether the amount of data to be transmitted by the user equipment satisfies a predetermined condition. When the predetermined condition is satisfied, it is determined that the uplink data transmission is performed based on the uplink grant based scheduling manner, otherwise the uplink data transmission is performed based on the uplink grant free scheduling manner. The amount of data to be transmitted by the user equipment may be characterized by a Buffer Status Report (BSR). For example, the predetermined condition may be that the BSR is greater than the threshold.

The user equipment according to the eighth example of the present invention includes the communication parameter determining unit 601 and the scheduling manner determining unit 602.

The communication parameter determining unit 601 is configured to determine the communication parameter regarding the user equipment. In the eighth example, the communication parameter may be a channel condition parameter of the user equipment.

The scheduling manner determining unit 602 is configured to determine, based on the communication parameter and the threshold regarding the communication parameter, to perform uplink data transmission based on the uplink grant based scheduling manner, or to perform the uplink data transmission based on the uplink grant free scheduling manner.

Specifically, the scheduling manner determining unit 602 may judge whether the channel condition parameter of the user equipment satisfies the predetermined condition. When the predetermined condition is satisfied, it is determined that the uplink data transmission is performed based on the uplink grant based scheduling manner, otherwise the uplink data transmission is performed based on the uplink grant free scheduling manner. The channel condition parameter of the user equipment may be characterized by a Reference Signal Received Power (RSRP). For example, the predetermined condition may be that the RSRP is greater than the threshold.

The user equipment according to a ninth example of the present invention includes the communication parameter determining unit 601 and the scheduling manner determining unit 602.

The communication parameter determining unit 601 is configured to determine the communication parameter regarding the user equipment. In the ninth example, the communication parameter may be the amount of data to be transmitted by the user equipment and the channel condition parameter of the user equipment.

The scheduling manner determining unit 602 is configured to determine, based on the communication parameter and the threshold regarding the communication parameter, to perform uplink data transmission based on the uplink grant based scheduling manner, or to perform the uplink data transmission based on the uplink grant free scheduling manner.

Specifically, the scheduling manner determining unit 602 may judge whether the amount of data to be transmitted by the user equipment and the channel condition parameter of the user equipment satisfy the predetermined condition. When the predetermined condition is satisfied, it is determined that the uplink data transmission is performed based on the uplink grant based scheduling manner, otherwise the uplink data transmission is performed based on the uplink grant free scheduling manner. The amount of data to be transmitted by the user equipment may be characterized by a Buffer Status Report (BSR). The channel condition parameter of the user equipment may be characterized by a Reference Signal Received Power (RSRP). For example, the predetermined condition may include: when the amount of data to be transmitted by the user equipment is greater than a first threshold X1, the channel condition parameter of the user equipment is smaller than a second threshold; and when the amount of data to be transmitted by the user equipment is smaller than the first threshold, the channel condition parameter of the user equipment is smaller than a third threshold. As a third example, in the user equipment according to the present invention, the communication parameter may be the amount of data to be transmitted by the user equipment and the channel condition parameter of the user equipment, and the threshold includes a first threshold for the amount of data to be transmitted by the user equipment and a second threshold and a third threshold for the channel condition parameter of the user equipment, and the predetermined condition includes: when the amount of data to be transmitted by the user equipment is greater than a first threshold, the channel condition parameter of the user equipment is smaller than a second threshold; and when the amount of data to be transmitted by the user equipment is smaller than the first threshold, the channel condition parameter of the user equipment is smaller than a third threshold.

The user equipment according to a tenth example of the present invention includes the communication parameter determining unit 601 and the scheduling manner determining unit 602.

The communication parameter determining unit 601 is configured to determine the communication parameter regarding the user equipment. In the tenth example, the communication parameter may be a delay requirement associated with a type of transmitted data.

In the tenth example, the user equipment further includes: the receiving unit (not shown in the figure), configured to receive information indicating a communication load of a cell from the base station.

The scheduling manner determining unit 602 is configured to determine, based on the information indicating the communication load of the cell, the delay requirement, and a threshold regarding the delay requirement, to perform the uplink data transmission based on the uplink grant based scheduling manner, or to perform the uplink data transmission based on the uplink grant free scheduling manner.

For example, in the tenth example, the user equipment may select the scheduling manner based on different principles according to the communication load of the cell. in the case that the communication load is heavy, if the delay requirement is low (that is, the delay is long), the UGF scheduling manner is selected; if the delay requirement is high (that is, the delay is short), the UGB scheduling manner is selected. On the other hand, in the case that the communication load is light, if the delay requirement is low (that is, the delay is long), the UGB scheduling manner is selected; if the delay requirement is high (that is, the delay is short), the UGF scheduling manner is selected.

The scheduling manner determining unit 602 as described in the seventh to tenth examples above may be configured to judge whether a relationship between the communication parameter and the threshold regarding the communication parameter satisfies the predetermined condition. If it is determined that the relationship between the communication parameter and the threshold satisfies the predetermined condition, it is determined that the uplink data transmission is performed based on the uplink grant based scheduling manner. On the other hand, if it is determined that the relationship between the communication parameter and the threshold does not satisfy the predetermined condition, it is determined that uplink data transmission is performed based on the uplink grant free scheduling manner.

Figure 7:
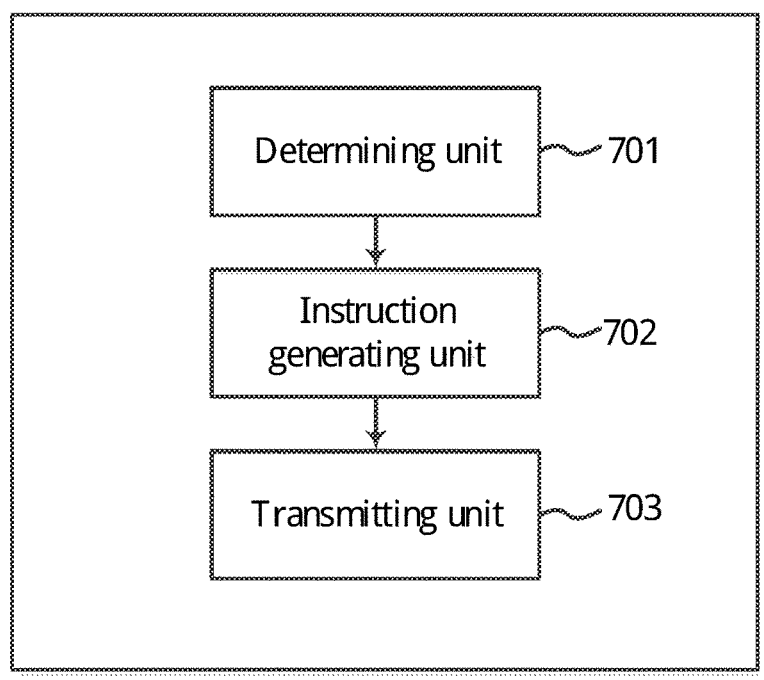
FIG. 7 is a functional block diagram illustrating a configuration of a base station for performing uplink scheduling scheme determination according to the present invention.

Finally, a base station according to the embodiments of the present invention for performing determination of an uplink scheduling manner will be described with reference to FIG. 7. As shown in FIG. 7, the base station 700 includes: a determining unit 701, an instruction generating unit 702, and a transmitting unit 703.

The determining unit 701 is configured to determine a communication parameter of the base station.

The instruction generating unit 702 is configured to generate, based on the communication parameter, a first instruction that indicates to perform uplink data transmission based on an uplink grant based scheduling manner, or a second instruction that indicates to perform the uplink data transmission based on an uplink grant free scheduling manner.

The transmitting unit 703 is configured to transmit the generated first instruction or second instruction to the user equipment.

After receiving the first instruction or second instruction from the base station, the user equipment determines to perform the uplink data transmission based on the uplink grant based scheduling manner, or to perform the uplink data transmission based on the uplink grant free scheduling manner.

For example, as a possible implementation, the instruction generating unit 702 may judge whether the communication parameter satisfies the predetermined condition. When it is determined that the communication parameter satisfies the predetermined condition, the instruction generating unit 702 generates the first instruction that indicates to perform the uplink data transmission based on the uplink grant based scheduling manner. When it is determined that the communication parameter does not satisfy the predetermined condition, the instruction generating unit 702 generates the second instruction that indicates to perform the uplink data transmission based on the uplink grant free scheduling manner.

Next, several specific implementations of the base station for performing determination of the uplink scheduling manner according to the present invention will be described.

The base station for performing determination of the uplink scheduling manner according to an eleventh example of the present invention includes the determining unit 701, the instruction generating unit 702, and the transmitting unit 703.

The determining unit 701 is configured to determine the communication parameter of the base station. In the eleventh example, the communication parameter is a communication load in a cell.

The instruction generating unit 702 is configured to generate, based on the communication parameter, a first instruction that indicates to perform the uplink data transmission based on an uplink grant based scheduling manner, or a second instruction that indicates to perform the uplink data transmission based on an uplink grant free scheduling manner.

The transmitting unit 703 is configured to transmit the generated first instruction or second instruction to the user equipment.

Specifically, the instruction generating unit 702 may judge whether the communication load in the cell satisfies the predetermined condition. When the predetermined condition is satisfied, the instruction generating unit 702 generates the first instruction that indicates to perform the uplink data transmission based on the uplink grant based scheduling manner, otherwise generates the second instruction that indicates to perform the uplink data transmission based on the uplink grant free scheduling manner. The predetermined condition may be that the communication load is greater than the threshold regarding the communication load.

The base station for performing determination of the uplink scheduling manner according to an twelfth example of the present invention includes the determining unit 701, the instruction generating unit 702, and the transmitting unit 703.

The determining unit 701 is configured to determine the communication parameter of the base station. In the twelfth example, the current communication parameter is an aperiodic CSI feedback trigger indication.

The instruction generating unit 702 is configured to generate, based on the communication parameter, a first instruction that indicates to perform the uplink data transmission based on an uplink grant based scheduling manner, or a second instruction that indicates to perform the uplink data transmission based on an uplink grant free scheduling manner.

The transmitting unit 703 is configured to transmit the generated first instruction or second instruction to the user equipment.

Specifically, the instruction generating unit 702 may judge whether the aperiodic CSI feedback trigger instruction satisfies the predetermined condition. When the predetermined condition is satisfied, the instruction generating unit 702 generates the first instruction that indicates to perform the uplink data transmission based on the uplink grant based scheduling manner, otherwise generates the second instruction that indicates to perform the uplink data transmission based on the uplink grant free scheduling manner. For example, the predetermined condition is that the aperiodic CSI feedback trigger indication indicates that a user equipment is required to report aperiodic CSI feedback.

Since the user equipment and the base station used to perform the determination of the uplink scheduling manner according to the present invention completely correspond to the method described previously, in order to avoid redundancy, the details are not described in detail, and reference may be made to the method for determining the uplink scheduling manner performed by the user equipment and the method for determining the uplink scheduling manner performed by the base station described above.

It should be noted that block diagrams used for the illustration of the above embodiments represent blocks in functions. These functional blocks (structural units) may be realized by any combination of hardware and/or software. In addition, the means for implementing respective functional blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 8:
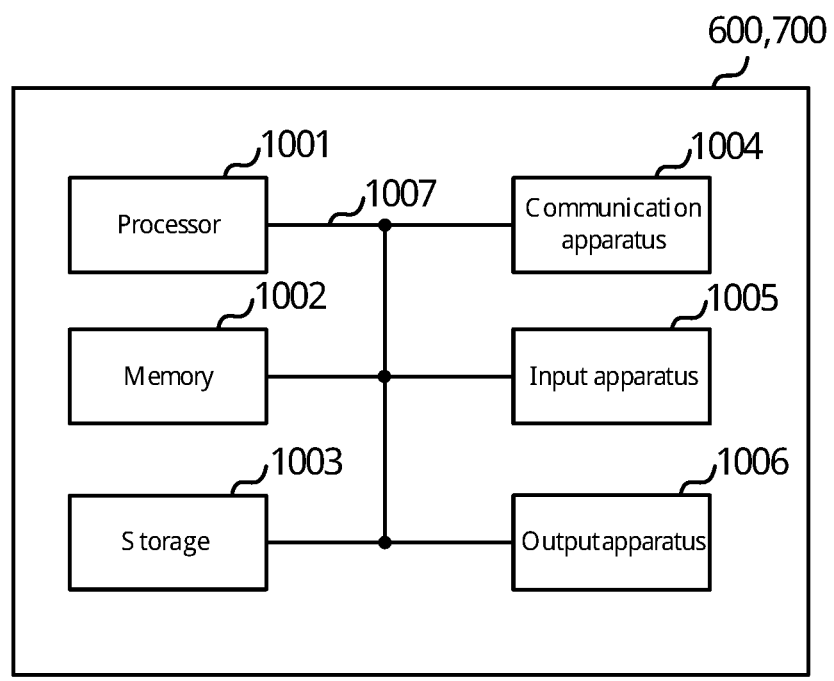
FIG. 8 is a diagram illustrating an example of a hardware configuration of a related base station and a user equipment according to an embodiment of the present invention.

For example, the base station, user equipment, and the like in the embodiment of the present invention can function as a computer that executes processing of the wireless communication method of the present invention. FIG. 8 is a diagram illustrating an example of a hardware configuration of a related base station and a related user equipment according to an embodiment of the present invention. The above described base station 700 and user equipment 600 may be physically designed as a computer apparatus including a processor 1001, a memory 1002, a storage 1003, a communication apparatus 1004, an input apparatus 1005, an output apparatus 1006, and a bus 1007 and the like.

It should be noted that, in the following description, the word 'unit_ may be replaced by 'circuit_, 'equipment_, 'apparatus_ and so on. It should be noted that the hardware structure of a base station 700700 and a user equipment 600 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. It should be noted that the processor 1001 may be implemented with one or more chips.

Each function of the base station 700 and user equipment 600 is implemented by reading predetermined software (program) on hardware such as the processor 1001 and the memory 1002, so as to make the processor 1001 perform calculations, and by controlling the communication carried out by the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the generating unit 101, determining unit 202, and the like described above may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the communication parameter determining unit 601, scheduling manner determining unit 602 of the user device 600, and determining unit 701 and instruction generating unit 702 of the base station 700 may be implemented by a control program stored in the memory 1002 and operated by the processor 1001, and may also be implemented similarly for other function blocks.

The memory 1002 is a computer-readable recording medium, and may be constituted by, for example, at least one of a ROM (Read Only Memory), an EPROM (Erasable Programmable ROM), an EE PROM (Electrically EPROM), a RAM (Random Access Memory) and/or other appropriate storage media. The memory 1002 may be referred to as a 'register, a 'cache, a 'main memory_ (primary storage apparatus) and so on. The memory 1002 can store executable programs (program codes), software modules and so on for implementing the wireless communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as 'secondary storage apparatus._

The communication apparatus 1004 is hardware (transmitting/receiving device) for allowing inter-computer communication by using wired and/or wireless networks, and may be referred to as, for example, a 'network device_, a 'network controller_, a 'network card_, a 'communication module_ and so on. The communication apparatus 1004 may be configured to include a high frequency switch, a duplexer, a filter, a frequency synthesizer and so on in order to realize, for example, frequency division duplex (FDD) and/or time division duplex (TDD). For example, the transmitting unit 903 and the like described above may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). It should be noted that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the base station 700 and user equipment 600 may be structured to include hardware such as a microprocessor, a digital signal processor (DSP), an ASIC (Application-Specific Integrated Circuit), a PLD (Programmable Logic Device), an F PGA (Field Programmable Gate Array) and so on, and part or all of the functional blocks may be implemented by the hardware. For example, the processor 1001 may be installed with at least one of these pieces of hardware.

(Variant)

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an 'RS (Reference Signal)_, and may be referred to as a 'pilot_, a 'pilot signal_ and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple microslots. Each microslot may be comprised of one or more symbols in the time domain. Furthermore, a microslot may also be referred as 'a subframe_.

A wireless frame, a subframe, a slot, a microslot and a symbol all represent the time unit when transmitting signals. A wireless frame, a subframe, a slot, a microslot and a symbol may also use other names that correspond to each other. For example, one subframe may be referred to as a 'transmission time interval (TTI)_, and a plurality of consecutive subframes may also be referred to as a 'TTI_, and one slot or one microslot may also be referred to as a 'TTI._ That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in wireless communication, for example. For example, in LTE systems, a base station schedules the wireless resources (such as the frequency bandwidth and transmission power that can be used in each user equipment) to allocate to each user equipment in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a 'normal TTI_ (TTI in LTE Rel. 8 to 12), a 'standard TTI_, a 'long TTI_, a 'normal subframe_, a 'standard subframe_, or a 'long subframe_, and so on. A TTI that is shorter than a normal TTI may be referred to as a 'shortened TTI_, a 'short TTI_, a 'partial (or fractional) TTI_, a 'shortened subframe_, a 'short subframe_, a 'microslot_, or a 'short microslot_ and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a 'physical resource block (PR B (Physical RB))_, a 'Sub-Carrier Group (SCG)_, a 'Resource Element Group (REG)_, a 'PRG pair_, an 'RB pair_ and so on.

Also, a resource block may also be composed of one or more resource elements (RE). For example, one RE can be a wireless resource area of a subcarrier and a symbol.

It should be noted that the above-described structures of wireless frames, subframes, slots, microslots and symbols and so on are simply examples. For example, configurations such as the number of subframes included in a wireless frame, the number of slots of each subframe or wireless frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as 'RRC messages_, and can be, for example, an RRC connection setup message, RRC connection reconfiguration message, and so on. Also, MAC signaling may be reported using, for example, MAC control elements (MAC C E s (Control Elements)).

Also, reporting of predetermined information (for example, a reporting 'X_) does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as 'software_, 'firmware_, 'middleware_, 'microcode_ or 'hardware description language_, or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms 'system_ and 'network_ as used herein are used interchangeably.

In the present specification, the terms 'base station (BS)_, 'radio base station_, 'eNB_, 'gNB_, 'cell_, 'sector, 'cell group_, 'carrier_ and 'component carrier_ may be used interchangeably. A base station may be referred to as a 'fixed station_, sNodeB_, 'eNodeB (eNB)_, 'access point_, transmission' point_, receiving point_, 'femto cell_, small' cell_ and so on.

A base station can accommodate one or more (for example, three) cells (also referred to as 'sectors_). When a base station accommodates a plurality of cells, the entire coverage area of the base station can be partitioned into a plurality of smaller areas, and each smaller area can provide communication services with base station subsystems (for example, indoor small base stations (RRHs (Remote Radio Heads))). The term 'cell_ or 'sector_ refers to part or all of the coverage area of a base station and/or a base station subsystem that provides communication services within this coverage.

In the present specification, the terms mobile station (MS)_, 'user terminal_, 'user equipment (UE)_ and 'terminal_ may be used interchangeably. The base station is sometimes referred to by terms such as a fixed station, a NodeB, a eNodeB (eNB), an access point, an transmitting point, a receiving point, a femto cell, and small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the base stations in this specification may be interpreted as user equipments. For example, each aspect/embodiment of the present invention may be applied to a configuration in which communication between a base station and a user equipment is replaced with communication among a plurality of user equipments (D2D (Device-to-Device)). In this case, the base station 700 may have the functions of the user equipment 600. In addition, terms such as 'uplink_ and 'downlink_ may be interpreted as 'side._ For example, an uplink channel may be interpreted as a side channel.

Likewise, the user equipments in this specification may be interpreted as base stations. In this case, the base stations 700 may have the functions of the user equipment 600 described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideBand), Bluetooth (registered trademark) and other adequate radio communication methods, and/or next-generation systems that are enhanced based on these.

The phrase 'based on_ as used in this specification does not mean 'based only on_, unless otherwise specified. In other words, the phrase 'based on_ means both 'based only on_ and 'based at least on._

Any reference to elements with designations such as 'first_, 'second_ and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms 'judge_ and 'determine_ as used herein may encompass a wide variety of actions. For example, to 'judge_ and 'determine_ as used herein may be interpreted to mean making judgements and determinations related to calculating, computing, processing, deriving, investigating, looking up (for example, searching a table, a database or some other data structure), ascertaining and so on. Furthermore, to 'judge_ and 'determine_ as used herein may be interpreted to mean making judgements and determinations related to receiving (for example, receiving information), transmitting (for example, transmitting information), inputting, outputting, accessing (for example, accessing data in a memory) and so on. In addition, to 'judge_ and 'determine_ as used herein may be interpreted to mean making judgements and determinations related to resolving, selecting, choosing, establishing, comparing and so on. In other words, to 'judge_ and 'determine_ as used herein may be interpreted to mean making judgements and determinations related to some action.

As used herein, the terms 'connected_ and 'coupled_, or any variation of these terms, mean all direct or indirect connections or coupling between two or more elements, and may include the presence of one or more intermediate elements between two elements that are 'connected_ or 'coupled_ to each other. The coupling or connection between the elements may be physical, logical or a combination of these. For example, 'connection_ may be interpreted as 'access._ As used herein, two elements may be considered 'connected_ or 'coupled_ to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as 'including_, 'comprising_ and variations of these are used in this specification or in claims, these terms are intended to be inclusive, in a manner similar to the way the term 'provide_ is used. Furthermore, the term 'or_ as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A method for determining an uplink scheduling manner performed by a user equipment, comprising:

determining a communication parameter regarding the user equipment;

determining, based on the communication parameter and a threshold regarding the communication parameter, to perform uplink data transmission based on an uplink grant based scheduling manner, or to perform the uplink data transmission based on an uplink grant free scheduling manner, wherein the communication parameter includes a channel condition parameter of the user equipment, and wherein, the communication parameter further includes a delay requirement associated with a type of transmitted data;

receiving, from a base station, information indicating a communication load of a cell; and determining, based on the information indicating the communication load of the cell, the delay requirement and a threshold regarding the delay requirement, to perform the uplink data transmission based on the uplink grant based scheduling manner, or to perform the uplink data transmission based on the uplink grant free scheduling manner.

2. The method according to claim 1, wherein,
the communication parameter includes an amount of data to be transmitted by the user equipment.

3. The method according to claim 1, further comprising:
receiving, from the base station, information for the threshold regarding the communication parameter.

4. The method according to claim 1, further comprising:
determining the threshold based on historical communication data of the user equipment.

5. A user equipment for performing determination of an uplink scheduling manner, comprising:
a communication parameter determining unit, configured to determine a communication parameter regarding the user equipment;
a scheduling manner determining unit, configured to determine, based on the communication parameter and a threshold regarding the communication parameter, to perform uplink data transmission based on an uplink grant based scheduling manner, or to perform the uplink data transmission based on an uplink grant free scheduling manner,
wherein the communication parameter includes a channel condition parameter of the user equipment; and
a receiving unit, configured to receive information indicating a communication load of a cell from a base station,
wherein:
the communication parameter further includes a delay requirement associated with a type of transmitted data, and
the scheduling manner determining unit is further configured to determine, based on the information indicating the communication load of the cell, the delay requirement, and a threshold regarding the delay requirement, to perform the uplink data transmission based on the uplink grant based scheduling manner, or to perform the uplink data transmission based on the uplink grant free scheduling manner.

6. The user equipment according to claim 5, wherein
the communication parameter includes an amount of data to be transmitted by the user equipment.

7. The user equipment according to claim 5, further comprising:
the receiving unit, configured to receive information for the threshold regarding the communication parameter from the base station.

8. The user equipment according to claim 5, further comprising:
a threshold determining unit, configured to determine the threshold based on historical communication data of the user equipment.

9. A base station for performing determination of an uplink scheduling manner, comprising:
a determining unit, configured to determine a communication parameter of the base station;
an instruction generating unit, configured to generate, based on the communication parameter, a first instruction that indicates to perform uplink data transmission based on an uplink grant based scheduling manner, or a second instruction that indicates to perform the uplink data transmission based on an uplink grant free scheduling manner; and
a transmitting unit, configured to transmit the generated first instruction or the second instruction to the user equipment,
wherein the communication parameter is an aperiodic CSI feedback trigger indication, and
when a predetermined condition is satisfied, the first instruction that indicates to perform uplink data transmission based on the uplink grant based scheduling manner is generated, otherwise the second instruction that indicates to perform the uplink data transmission based on the uplink grant free scheduling manner is generated.

10. The base station according to claim 9, wherein
the communication parameter is a communication load in a cell.

* * * * *